United States Patent [19]

Schramm et al.

[11] Patent Number: 4,609,532

[45] Date of Patent: Sep. 2, 1986

[54] REACTOR FEED TUBE ADJUSTABLE MOUNTING ASSEMBLY AND METHOD

[75] Inventors: Dale E. Schramm; Oscar T. Scott, IV, both of Borger, Tex.

[73] Assignee: J. M. Huber Corporation, Locust, N.J.

[21] Appl. No.: 647,948

[22] Filed: Sep. 5, 1984

[51] Int. Cl.⁴ .............................................. B01J 1/00
[52] U.S. Cl. .................................. 422/145; 422/146; 422/173; 422/232
[58] Field of Search ............... 422/129, 145, 146, 173, 422/310, 232

[56] References Cited

U.S. PATENT DOCUMENTS 2,863,735  12/1958  Brater et al. ........................ 422/232
3,190,470  6/1965  Ritter ................................... 422/232

Primary Examiner—Frank Sever

Attorney, Agent, or Firm—Alec H. Horn

[57] ABSTRACT

A mounting assembly 4 is provided for a feed tube 12 of a high-temperature fluid-wall reactor of the type having a vertically oriented reactor tube heated to incandescence for emitting radiation radially inward to a reaction zone. The mounting assembly 4 comprises a tube support 34 having an opening 42 through which the feed tube 12 can pass, and a pivot seat member 30 secured to the reactor. The assembly 4 further comprises a retainer 52 for selectively fixing the orientation of the feed tube relative to the reactor, and a releasable attachment mechanism 70 for allowing the axial position of the feed tube to be adjusted relative to the assembly 4. According to the method of the invention, undesirable conditions within the reactor are detected, and the orientation of the feed tube is pivotably adjusted in response thereto for reducing undesirable reactor operating conditions.

20 Claims, 4 Drawing Figures

REACTOR FEED TUBE ADJUSTABLE MOUNTING ASSEMBLY AND METHOD

FIELD OF THE INVENTION

The present invention relates to an assembly for adjustably mounting a feed tube on a high-temperature chemical reactor, and more particularly, to an assembly for pivotably mounting a feed tube on a fluid-wall reactor having a reaction zone spaced interiorly of a reaction tube. The invention is also directed to a method for pivotably adjusting the feed tube discharge to increase continuous reactor operating life.

BACKGROUND OF THE INVENTION

U.S. Pat. No. 4,199,545 discloses a chemical reactor capable of carrying out selected chemical reactions at extremely high temperatures. The reactor includes a reactor tube mounted in a generally vertical orientation. The reactor tube is made of a fabric of a fibrous refractory material capable of being heated to temperatures at which it emits intense radiant energy. The reactor also includes electrically resistive heating elements spaced about the reactor tube for heating a reaction zone spaced interiorly of the tube. A heat shield surrounds the heating elements and the reactor tube to reflect radiant energy toward the reaction zone.

In operation, reactants are dropped through the heated reaction zone of the reactor tube where they are heated to high temperatures by radiant energy emitted by the reactor tube. In order to prevent reactants and reaction products from engaging the interior wall of the reactor tube, a gas which is substantially transparent to radiant energy and preferably inert with respect to the tube material is passed through the pores of the fibrous tube to form a fluid wall for the inner surface of the reactor tube.

The '545 patent discloses inlet assemblies secured to the housing of the reactor for introducing liquid and solid reactants into the reaction zone of the reactor. The inlet assemblies include an inlet tube which extends into the reactor tube generally along an axis of the reactor tube. In the case of the inlet assembly for liquid reactants, a fogging nozzle is mounted on the end of the inlet tube.

The inlet assemblies for the reactor of the '545 patent have given rise to a number of significant problems. If the axis of the inlet tube is not correctly aligned with the axis of the reactor tube, feedstock discharged from the inlet tube may be directed toward the inner surface of the reactor tube with sufficient force to penetrate the fluid wall and engage the inner surface of the reactor tube. At the high temperatures at which the reactor operates, feedstock typically reacts with the reactor tube material, so that impingement of feedstock on the inner surface of reactor tube will corrode and destroy the reactor tube. In addition, feedstock may form deposits on the inner surface of the reactor tube, which may build up and restrict the flow of gas through the reactor tube, thereby further reducing the effectiveness of the fluid wall.

Misalignment of the inlet tube for the reactor disclosed in the '545 patent is difficult to avoid (because of component tolerances) and troublesome to correct. In order to change the alignment of the inlet tube relative to the reactor tube, the top section of the reactor housing may be shimmed or the inlet tube may be bent. However, even if the inlet tube and the reactor tube are coaxially aligned when the reactor is cool, misalignment often reoccurs when the reactor is heated, since the high temperatures cause structural elements of the reactor to warp or expand at different rates.

An additional problem with the reactor of the '545 patent relates to its inability to effectively compensate for undesirable operating conditions while the reactor is operating. Even if the inlet tube is axially aligned with the reactor tube, the reactor operation is affected by numerous operational variances, e.g., the feedstock input rate and material, the gas injection rate, the uniformity of the fluid wall, and the output from each of the heating elements. Fluctuations in these operational variances may cause undesirable operating conditions which may be minimized or corrected by techniques which involve the termination of the reactor operation, the correction for the undesirable condition, and the subsequent commencement of the reactor operation. Those skilled in the art recognize that such "shut down" and "start up" operations are expensive, time consuming, and contribute to reduced life for many reactor components.

The disadvantages of the prior art are overcome by the present invention, and an improved reactor feed tube mounting assembly is hereinafter disclosed which is pivotably adjustable with respect to the reactor tube. Also disclosed is an improved method of effectively increasing reactor operational time by pivotally adjusting of the feed tube relative to the reactor to compensate for or correct undesirable reactor operating conditions.

SUMMARY OF THE INVENTION

An improved assembly for mounting a feed tube to a high-temperature chemical reactor is provided. The mounting assembly facilitates proper alignment of the feed tube with the reactor tube, and enables the reactor tube to be easily adjusted during reactor operations to correct for various deleterious reactor operating conditions.

The mounting assembly of the invention comprises a pivotable feed tube support for attachment to the feed tube, and a pivot seat member fixedly mounted to the reactor. The feed tube support has a guide opening through which the feed tube can pass, and a bearing surface shaped to permit the support to pivot about the seat member. An attachment mechanism is provided for securing the feed tube to the support, while also enabling the feed tube to be axially positioned with respect to the mounting assembly.

The pivot seat member also has an opening through which the feed tube can pass. A pivot seat bearing surface is generally complimentary to the support bearing surface, thereby allowing slidable movement between the bearing surfaces to permit the feed tube to pivot relative to the reactor and the reactor tube. A pivot retainer is interconnected between the seat member and the feed tube support. The retainer may be locked and unlocked to prevent or permit the feed tube support and the feed tube to pivot relative to the seat member and the reactor tube.

According to the method of the present invention, the position of the feed tube discharge relative to the reactor may be adjusted while the reactor is operating. The reactor tube may be pivotably oriented to correct or compensate for deleterious reactor operating conditions, thereby increasing the length of continuous reactor operating time and effectively increasing the life of reactor components. As an example, it may be observed that a particular portion of a fluid wall is beginning to "breakdown" as the feedstock input rate increases, so that reactant particles are engaging a portion of the reactor tube interior wall. Rather than reduce the feedstock input rate, the reactor tube may be pivotably oriented according to the present invention to direct the feedstock in a direction slightly away from the observed fluid wall breakdown. The continued engagement of the feedstock with the interior tube surface may thus be substantially reduced or eliminated, thereby increasing the life of the reactor tube.

Preferred embodiments of the invention, while permitting the feed tube to be conveniently adjusted in orientation and axial position while the reactor is in operation, maintain a gas-tight seal between the interior of the reactor and the ambient atmosphere. Thus, adjustments in the orientation and depth of insertion of the feed tube may be made without introducing oxygen from the atmosphere into the reactor. The gas-tight seals associated with the feed tube assembly thus minimize oxidization of the heated reactor tube and heating elements, and prevent potentially noxious reactant products within the reactor from escaping into the atmosphere.

These and other features and advantages of the present invention will become apparent from the following detailed description, wherein reference is made to the Figures in the accompanying drawings.

DETAILED DESCRIPTION OF PREFERRED EMBODIMENTS

Figure 1:
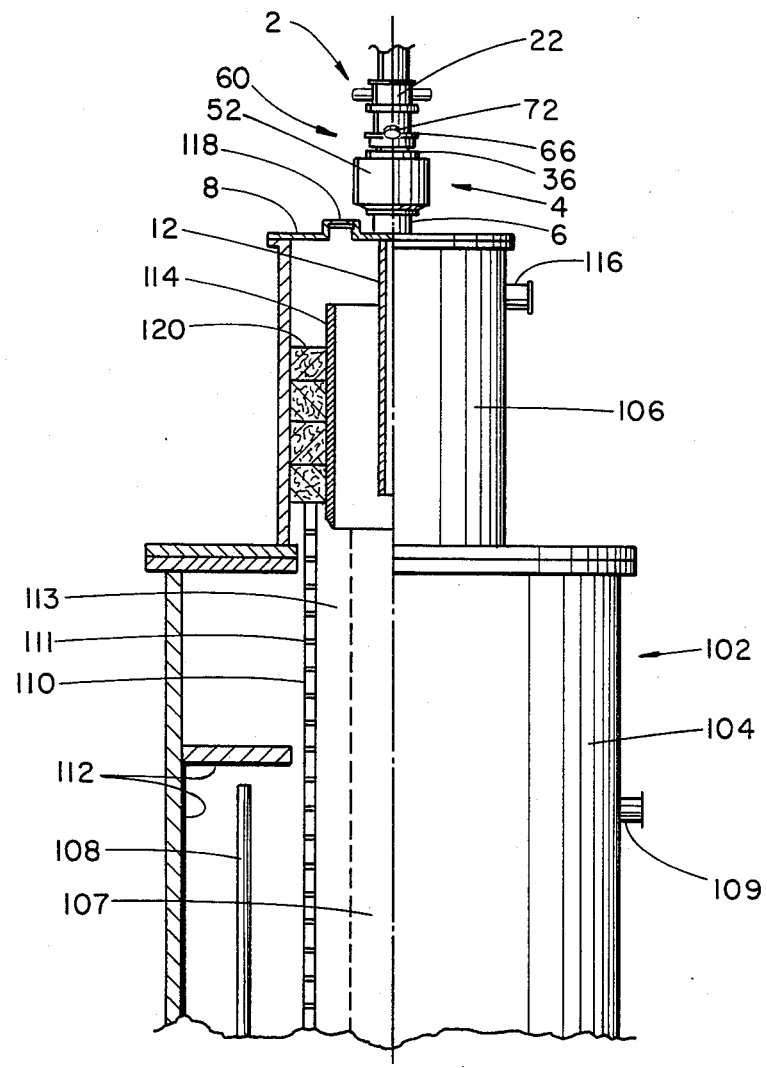
FIG. 1 is a plan view in partial section of a portion of a reactor including a feed tube and an adjustable mounting assembly according to the present invention.

FIG. 1 depicts a top portion of a high-temperature fluid-wall reactor 102 including a generally cylindrical and vertically oriented reactor housing 104 and an upper generally cylindrical reduced-diameter input housing 106 substantially aligned with the housing 104. Within housing 106 are a plurality of heating elements 108 which radiate energy to reactor tube 110 having a plurality of perforations 111. The interior of the housing includes radiation shields 112 which reflects radiant energy inward to heat the reactor tube 110 to incandescence. Reactor tube 110, in turn, radiates energy inward to heat reaction particles and gases within the reaction zone 107 spaced interiorly of the tube 110, in order to sustain the desired chemical reaction. Inert gas is injected into the reactor through a plurality of ports 109, with the gas passing through the perforated tube 110 to form a desired fluid wall in the annulus 113 between the tube and the reaction zone.

Within the reduced diameter housing 106 is a cylindrical-shaped drip lip 114 for preventing melted solids and liquids from dripping onto the reaction tube 110. A packing material 120 may be provided between the housing 106 and the drip lip 114. A feed tube 12 passes through an upper plate 8 of the reactor, and terminates within the housing 106. A port 116 is provided for introduction of a sweep gas, if desired. A plurality of sight glasses may be spaced about the tube 12 and above the reactor tube and drip lip, so that conditions within the reactor and the position of the feed tube 12 relative to the reaction tube 110 may be observed. Further details regarding a suitable reactor and, in particular, a suitable reactor tube are disclosed in U.S. patent application Ser. No. 647,958, filed concurrently herewith and hereby incorporated by reference.

Mounted above the plate 8 is a feed tube assembly 2 including a coolant distribution manifold 22. The mounting assembly 4 of the present invention is supported by fitting 6, and includes guide ring 36 and retainer 52. A gasket subassembly 60 includes a compression ring 66 and clamps 72 discussed subsequently. For the present, it should be understood that feedstock or reactor material is input to the reactor through a feed tube 12, and the desired chemical reaction occurs within zone 107 radiantly heated by the incandescent reactor tube 110. Reactant particles are prevented from engaging the interior wall of the reactor tube by gas passing through perforations in the reactor tube forming a fluid wall in annulus 113.

In a high-temperature fluid-wall reactor as shown in FIG. 1, it is preferable that the discharge from the feed tube be generally aligned with the centerline of the reactor tube 110 affixed within the reactor, and also that the centerline of the feed tube 12 be generally coaxial with the axis of the reactor tube 110. Proper alignment of the feed tube and the reactor tube minimizes the likelihood that reaction particles discharged from the feed tube 12 will break through the fluid wall and come into engagement with the reactor tube.

Misalignment of the feed tube and the reactor tube may occur for several reasons: the reactor housing, the reactor tube, and/or the feed tube may not be perfectly plumb or vertical, or if perfectly plumb, the central axis for each of these components may not be coaxial. Also, such components may be perfectly plumb and coaxial when at room temperature, but may deviate when the reactor is heated to a high temperature. The preferred alignment of these components may further be affected by various external factors, such as wind causing deflection of structural members supporting the reactor, and/or the movement of equipment or personnel about the reactor.

According to the concept of the present invention, a pivotable feed tube assembly is provided so that the feed tube may be pivotably adjusted with respect to the reactor 102 and the reactor tube 110, and the discharge end of the feed tube may be selectively moved in any direction in a substantially horizontal plane. Also, the discharge end of the reactor may be vertically adjusted according to the concepts of the present invention, so that the depth of insertion of the feed tube relative to the reactor may be easily varied. Moreover, both the orientation of the feed tube and the depth of the insertion may be adjusted according to the methods and apparatus of the present invention while the reactor is in operation.

Figure 2:
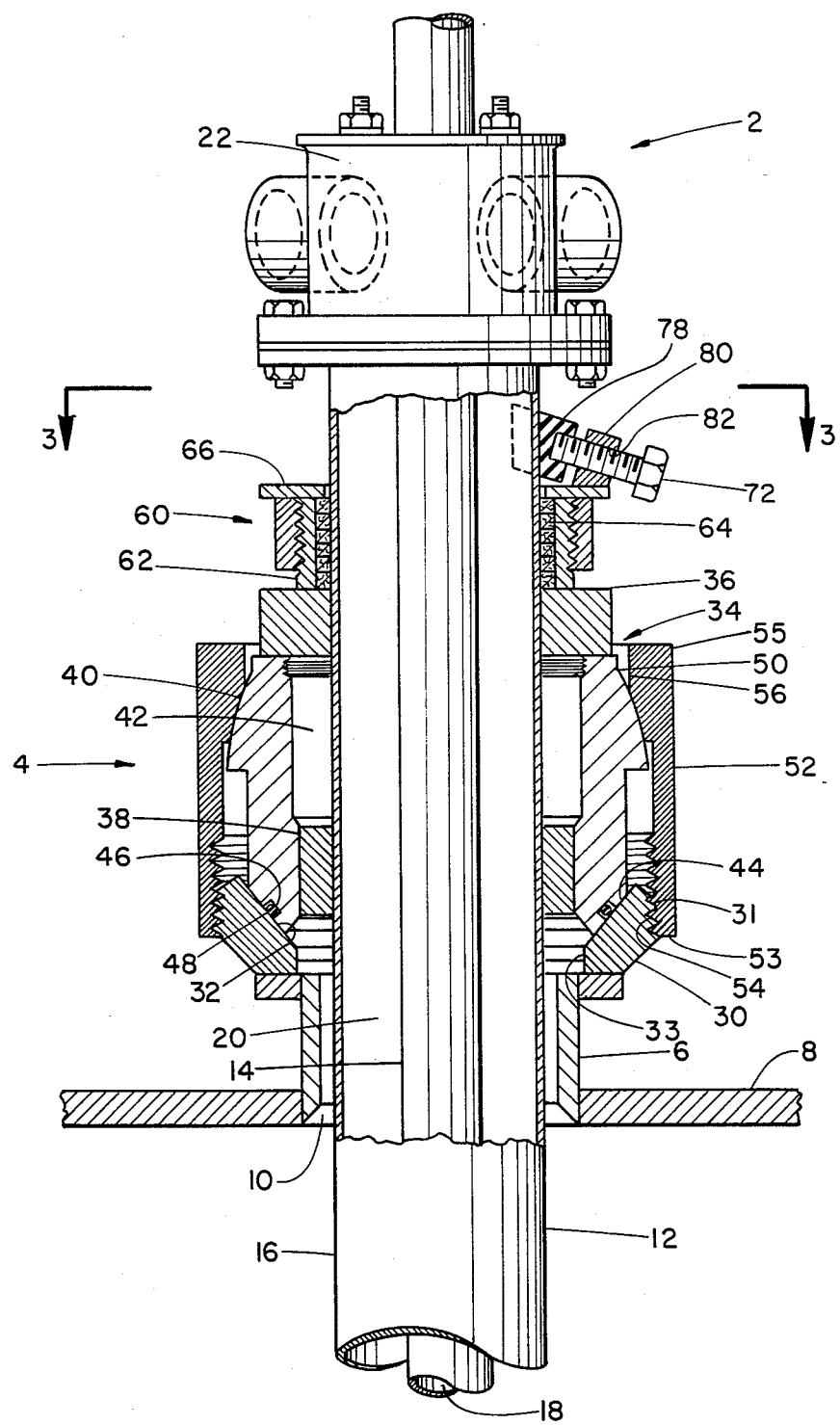
FIG. 2 is a plan view in partial section of the feed tube mounting assembly generally shown in FIG. 1.

Referring now to FIG. 2, a suitable mounting assembly according to the present invention is shown in detail. The mounting assembly 4 is connected to the feed inlet fitting 6 which, in turn, is welded to a top plate 8 of the reactor. An opening in the inlet fitting 6 defines a feed inlet port 10 of the reactor and provides communication with the interior of a reactor tube. A suitable feed tube assembly 2 shown in FIG. 2 includes a liquid-cooled feed tube 12 which comprises two concentric tubular walls: an inner wall 14 and an outer wall 16. Feed material can be introduced into the reactor through the tubular channel 18 defined by the inner wall 14. A liquid coolant for cooling the feed tube 12 can be circulated in an annular coolant channel 20 defined between the inner and outer walls 14 and 16 of the feed tube 12. The coolant distribution manifold 22 provides for the introduction and discharge of coolant from the coolant channel 20.

Further details regarding a suitable feed tube assembly are disclosed in U.S. patent application Ser. No. 647,959 filed concurrently herewith. It should be understood, however, that the mounting assembly and method of the present invention are not limited to a liquid-cooled feed tube, and are applicable to feed tubes of various types for a high-temperature reactor as disclosed herein.

The mounting assembly 4 includes a pivot seat member 30 which is connected to the feed inlet fitting 6 in a fluid-tight manner. A radially outer surface 31 of the pivot seat member 30 is threaded, and annular surface 33 defines a seat ring opening for receiving a portion of the feed tube. The inside diameter of the surface 33 is greater than the outside diameter of the outer wall 16 of the feed tube 12 to provide clearance to accommodate shifts in the pivotable orientation of the feed tube passing through the opening. A radially-inner surface of the pivot seat member 30 defines an annular pivot-seat bearing surface 32. The seat bearing surface 32 has a generally frustro-spheroidal configuration (a configuration corresponding to a portion of a surface of a sphere between two parallel cutting planes) having a center substantially coinciding with a centerline through the feed tube 12.

An annular feed tube support assembly 34 includes a first feed tube guide ring 36, a second feed tube guide ring 38 spaced apart axially from the first guide ring 36, and an annular pivot collar 40 connected between the two guide rings 36 and 38. The ring openings of the two guide rings 36 and 38 and the interior of the pivot collar 40 define a feed tube guide opening 42 through which the feed tube 12 passes. The inside diameters of the two guide rings are only slightly greater than the outside diameter of the wall 16 of the feed tube 12, and a central axis of the feed tube 12 substantially coincides with a centerline of the first and second guide rings 36 and 38.

The pivot collar 40 has an annular support bearing surface 44 which is frusto-spheroidal in configuration and is essentially complementary to the seat bearing surface 32. The support bearing surface 44 similarly has a spherical center substantially coinciding with the centerline through the feed tube 12, and has a radius slightly less than surface 32. The collar 40 rests on the seat ring 30, with the support bearing surface 44 of the pivot collar 40 in sliding engagement with the seat bearing surface 32. The complementary spheroidal shape of the two bearing surfaces 32 and 44 thus permits the support pivot assembly 34 to be pivoted relative to the pivot seat member 30.

A circular O-ring groove 46 extends circumferentially around the collar 40 about the support bearing surface 44. An O-ring seal 48 is fitted in the O-ring groove 46 to provide a fluid-tight seal between the collar 40 and the seat ring 30. The collar 40 also has a locking band surface 50 extending circumferentially around the collar. The surface 50 is generally frusto-spheroidal in shape and has a spherical center which generally coincides with the center of the imaginary sphere for surface 44.

A generally tubular retainer 52 has a seat end 53 and a support end 55. A length 54 of an interior surface of the pivot retainer 52 extending axially from the seat end 53 is internally threaded to mate with the threads 31 of the seat ring 30. The seat end 53 of the retainer 52 including the threaded length 54 of the interior surface can be slipped over the collar 40. An interior surface at the support end 55 of the pivot retainer 52 projects radially inward to form a pivot engagement band 56, which has an annular surface also of a generally frustospheroidal configuration complementary to the surface 50. The retainer 52 can be screwed onto the seat ring 30 so that the band 56 urges against the surface 50 of the pivot collar 40. Tightening the retainer 52 against the collar 40 locks the support pivot assembly 34 in a selected orientation. Unscrewing the pivot retainer 52 permits the support pivot assembly 34 to be manually pivoted, as explained hereafter.

The feed tube gasket assembly 60 is mounted on the first guide ring 36 of the support assembly 34. The assembly 60 includes an externally-threaded cylindrical gasket housing 62 joined to the ring 36 in a fluid-tight manner, a cylindrical feed tube gasket 64 located between the housing 62 and the outer wall 16 of the feed tube 12, and an internally-threaded gasket compression ring 66 which is threadably engaged to the housing 62. The gasket 64 thus forms a fluid-tight seal between the outer wall 16 of the feed tube 12 and the gasket housing 62.

Figure 3:
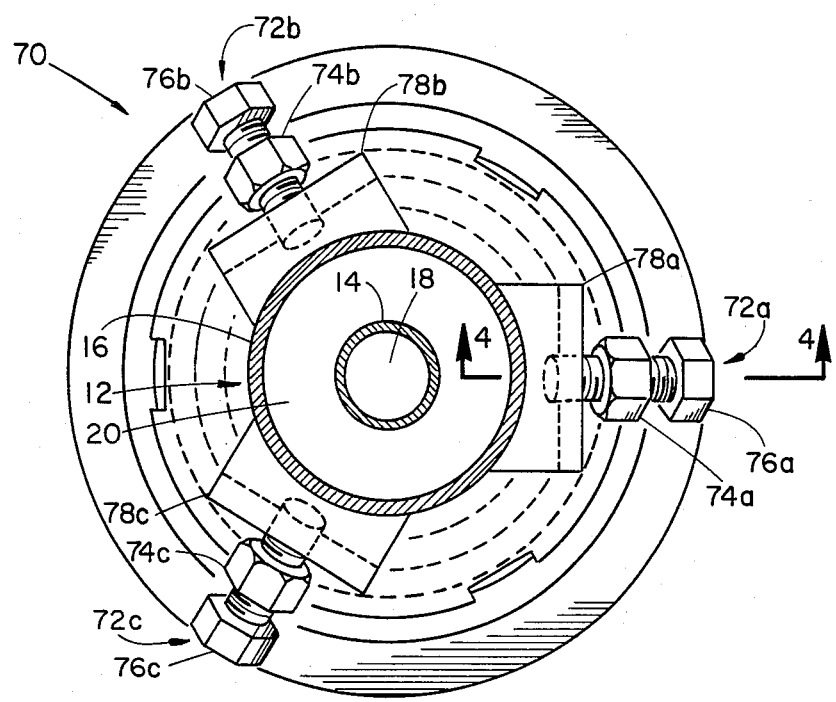
FIG. 3 is a section taken along line 3—3 of FIG. 2.
Figure 4:
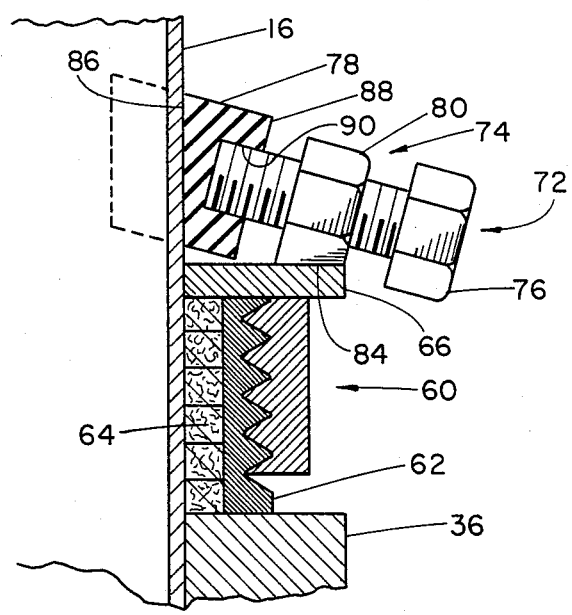
FIG. 4 is a cut-away section taken along line 4—4 of FIG. 3.

As shown best in FIG. 3, clamping assembly 70 includes three clamps 72a–c spaced apart azimuthally at approximately 120° intervals about the feed tube 12. Each clamp 72 includes a clamp support 74, a clamping bolt 76 and a feed tube clamp pad 78. As may be seen in FIG. 4, each clamp support 74 is attached to a top surface of the ring 66, which in turn is connected to the support assembly 34 via gasket housing 62. The clamp support 74 comprises a modified hexagonal nut 80 having a threaded bore 82, as shown in FIG. 1. The bore 82 extends in a direction which essentially intersects a centerline defined by the first and second guide rings 36 and 38 of the support pivot assembly 34. The nut 80 is modified in that a substantially planar attachment face 84 is machined in the nut. The normal of the attachment face 84 intersects the centerline of the bore 82 of the nut 80 at an angle of about 75°.

The clamp pads 78 may be made of a resilient neoprene, and have a clamping surface 86 which is generally complementary to the shape of the outer wall 16 of the feed tube 12. A clamping-bolt surface 88 of the pad 78 has an unthreaded clamping bolt recess 90 for receiving an end of a clamping bolt 76. The clamping bolts 76a–c are threaded through the bores 82 of corresponding clamp supports 74a–c and urge the clamp pads 78a–c against the outer wall 16 of the feed tube 12, thereby clamping the feed tube to the support pivot assembly 34. By loosening the three clamping bolts 76a–c and the compression ring 66, the axial position of the feed tube 12 relative to the assembly 4, and the length which the feed tube 12 is inserted into the corresponding reactor, can be manually adjusted. Also, the above apparatus enables the feed tube 12 to be fully withdrawn from the reactor and the mounting assembly for repair or replacement.

The apparatus of the present invention may thus be employed to compensate for misalignment between the feed tube and the reactor tube. While the reactor is operating, the orientation of the discharge end of the feed tube 12 may be altered so that (a) the center of the circular feedstock discharge opening is on the axis of the reactor tube 108, and/or (b) the axis of feed tube 12 is parallel with the axis of the reactor tube 108. The pivotable feed tube assembly of the present invention is thus preferable, for both flexibility and ease of operation, compared to a planar feed tube adjustment mechanism, whereby the axis of the feed tube would be fixed and the feed tube may be movable in a horizontal plane.

It has been observed that undesirable reactor operating conditions may be minimized or eliminated in many cases by pivotably orienting the feed tube 12 relative to the reactor tube 108—even if such pivotable orientation results in the discharge opening of the feed tube and/or the axis of the feed tube being out of alignment with the axis of the reactor tube. In other words, the pivotable feed tube assembly of the present invention enables the correction of or compensation for deleterious operating conditions. An easily regulatable control or "tuning" mechanism is therefore provided for influencing reactor operations.

According to the method of the invention, the feed tube 12 is pivotably supported relative to the reactor by suitable assembly 4, and the orientation of the feed tube may be fixed by tightening retainer 52 so that the feed tube and reactor tube are properly aligned. Thereafter, undesirable conditions within the reactor may be detected by visually observing conditions through one of the sight glasses 118. In response to observed conditions, the retainer 52 may be loosened and the feed tube manually reoriented to reduce (or completely eliminate) the undesirable condition. After reorientation, the feed tube 12 may be returned to its original position, and then refixed by tightening retainer 52. If the operator believes the same undesirable condition will likely reoccur, the feed tube 12 may be refixed in its reoriented position which reduced or eliminated the undesirable condition.

It should be understood that at the high temperatures at which the reactor is operating, the affects of variable reactor operating parameters are not fully understood. The versatility of the present invention may be better understood by the following example. The length of time the reactor tube has been in operation may indirectly affect the uniformity of the fluid wall. If a portion of the fluid wall begins to "break down", reactant particles may engage the interior wall of the reactor tube and quickly corrode and destroy the reactor tube. Rather than ruin the reactor tube, the reactor may be shut down to determine if the tube can be repaired to correct for this condition. Alternatively, such a fluid wall break down may, in part, be corrected by increasing the flow of nitrogen through the reactor core to increase the thickness of the fluid wall. Nitrogen usage is, however, a significant factor in determining overall reactor operating costs.

According to the present invention, the reactor need neither be shut down for repair nor may nitrogen usage necessarily be increased. Rather, the "break down" portion of the fluid wall may be visually detected through the sight glass, and the feed tube pivotably adjusted or reoriented to direct the flow of reactants from the feed tube slightly away from the location of the weak fluid wall. The feed tube may then be refixed in that position, so that reactor operations may be continued. Thus, the undesirable condition, i.e., the partial fluid wall "break down" within the reactor, may be easily and quickly corrected while the reactor is in operation.

As a further example of the method of the present invention, it may be desirable to increase reactor operating temperature while simultaneously increasing feedstock input. This change in reactor operation, however, may contribute to either a build-up of slag on the discharge end of the feed tube (which may alter the critical feedstock input direction), or a build-up of reaction particles near the exit of the reactor (which could plug the reactor). Rather than shut down the reactor, the feed tube may be reoriented to melt the slag off the end of the feed tube discharge, and the feed tube may then be returned to its original condition. Also, even a slight reorientation of the feed tube may affect the overall reactor operation, so that the build up at the exit of the reactor may similarly be corrected by reorienting the feed tube through trial and error techniques.

It is a further feature of the method of the present invention to alter the axial position of the feed tube 12 relative to the pivotable assembly 4, which alters the depth of insertion of the feed tube within the reactor and relative to the reactor tube. Thus, the apparatus of the present invention also enables the axial position of the feed tube to be selectively adjusted while the reactor is operating to simultaneously correct for undesirable operating conditions. As an example of such vertical or axial adjustment of the reactor tube, assume that the reactor is being utilized to produce carbon black. The observed conditions within the reactor may be satisfactory, but the operator may notice a slight deterioration in the quality of the carbon black being produced. In response to this observed deterioration in quality, the operator may lower the reactant tube, e.g., 1 in. (2.5 cm), thereby altering the temperature profile of feedstock as it first enters the reaction zone. This adjustment in the depth of insertion of the feed tube may sufficiently alter the reaction process to obviate the problem of deteriorating carbon black output.

The degree of pivotable adjustment and/or depth of adjustment of the feed tube in response to a detected undesirable reactor operating condition is currently a trial and error technique, since many variables are simultaneously contributing to successful reactor operation. It may be possible, in the future, to generate reliable quantitative data regarding reactor orientation and depth. It may be desirable, at that time, to provide a controlled means for orienting the reactor tube. A plurality of adjustable screw controls spaced about the feed tube, each supported by the pivot seat, may be provided for engagement with the ring 36. These screw controls (not shown) may thus be employed to precisely and quantitatively adjust the orientation of the feed tube in response to detected conditions.

It is not intended to limit the present invention to the specific embodiment described above. For example, the feed tube can be welded directly to the support pivot assembly if desired. Other changes and modifications may be made in the apparatus and methods specifically described herein without departing from the spirit and scope of the present invention. Accordingly, it should be understood that the embodiments described herein and shown in the accompanying drawings are exemplary only and are not intended as limitations on the scope of the invention.

What is claimed is:

1. An adjustable feed tube mounting assembly for mounting a feed tube of a high-temperature chemical reactor with the feed tube positioned and oriented to discharge feed material into a reactor tube, the mounting assembly comprising:
   a pivot seat member adapted to be fixed to said reactor and having a seat opening for receiving a portion of said feed tube and for accommodating pivotable displacement of said feed tube;
   a feed tube support in engagement with said feed tube and having a support bearing surface for engagement with said seat member and a support opening for receiving a portion of said feed tube;
   said pivot seat member having a seat bearing surface in engagement with said support bearing surface for permitting pivotable adjustment of said feed tube support relative to said pivot seat member sufficient for minimizing impingement of said feed material discharged from said feed tube on an inner surface of said reactor tube; and
   a retainer for permitting said feed tube support to be pivoted during operation of said reactor in a selected orientation while in an unlocked state and to be fixed with respect to said pivot seat member while in a locked state.

2. The mounting assembly as defined in claim 1, further comprising:
   releasable attachment means adapted for attaching said feed tube to said pivot support at a selected location and enabling axial positioning of said feed tube relative to said mounting assembly.

3. The mounting assembly as defined in claim 2, wherein said attachment means further comprises:
   a plurality of resilient clamping pads each having a clamping surface generally complimentary to the outer configuration of said feed tube; and
   a plurality of clamp members disposed about said feed tube support for urging said clamping pads into secured engagement with said feed tube.

4. The mounting assembly as defined in claim 1, further comprising:
   said seat bearing surface having a frustospherical configuration; and
   said support bearing surface having a frustospherical configuration with a radius of curvature slightly less than said seat bearing surface.

5. The mounting assembly as defined in claim 1, further comprising:
   a first fluid-tight seal between said support bearing surface and said seat bearing surface; and
   a second fluid-tight seal adapted for sealing between said feed tube support and said feed tube.

6. The mounting assembly as defined in claim 5, wherein:
   said first fluid-tight seal comprises an O-ring seal in engagement with said seat bearing surface; and
   said second fluid-tight seal comprises a generally cylindrical feed tube gasket encircling said feed tube opening and in sealing engagement with said feed tube.

7. In a high-temperature fluid-wall reactor having a vertically orientated cylindrical-shaped reactor tube, a feed tube for inputting reactants to a reaction zone spaced interiorly of said reaction tube, means for heating said reaction tube to incandescence for emitting radiation radially inward to said reaction zone for maintaining a desired chemical reaction, and means for passing gas through said reaction tube for forming a protective fluid wall for the inner surface of said reactor tube, the improvement comprising:
   a pivot seat member affixed to said reactor and having a seat opening for receiving a portion of said feed tube;
   a feed tube support in engagement with said feed tube and having a support opening for receiving a portion of said feed tube;
   said seat member forming a seat bearing surface having a frusto-spherical configuration for enabling pivotable orientation of said feed tube relative to said seat sufficient for minimizing impingement of said reactants input from said feed tube on an inner surface of said reaction tube;
   said feed tube support forming a support bearing surface having a frusto-sherical configuration for sliding engagement with said seat bearing surface;
   a first fluid-tight seal between said support bearing surface and said seat bearing surface;
   a second fluid-tight seal between said feed tube support and said feed tube; and
   a retainer adapted for permitting said pivot support to be pivoted during operation of said reactor to a selected orientation while in an unlocked state and to fix said pivot support while in a locked state.

8. The apparatus as defined in claim 7, further comprising:
   releasable attachment means for attaching said feed tube to said pivot support at a selected location and enabling axial positioning of said feed tube relative to said mounting assembly.

9. The apparatus as defined in claim 8, wherein said attachment means further comprises:
   a plurality of resilient clamping pads each having a clamping surface generally complimentary to the outer configuration of said feed tube; and
   a plurality of clamp members disposed about said feed tube support for urging said clamping pads into secured engagement with said feed tube.

10. The apparatus as defined in claim 7, further comprising:
    a sight glass spaced adjacent said pivot seat member for visually observing conditions within said reactor.

11. The apparatus as defined in claim 7, wherein:
    said first fluid-tight seal comprises an O-ring seal in engagement with said seat bearing surface; and
    said second fluid-tight seal comprises a generally cylindrical feed tube gasket encircling said feed tube opening and in sealing engagement with said feed tube.

12. A method for reducing undesirable conditions within a high-temperature fluid-wall reactor having a cylindrical-shaped reactor tube, a feed tube for inputting reactants into a reaction zone spaced interiorly of said reaction tube, means for heating said reaction tube to incandescence for emitting radiation radially inward to said reaction zone for sustaining a desired chemical reaction, and means for passing gas through said reaction tube for forming a protective fluid wall for the inner surface of said reactor tube, the method comprising the steps of:
    (a) pivotably supporting said feed tube relative to said reactor with a pivot mounting assembly;
    (b) selectively fixing the orientation of said feed tube relative to said reactor;
    (c) thereafter detecting an undesirable reactor operating condition;

(d) thereafter pivotably adjusting the orientation of said feed tube in response to said detected condition sufficient for minimizing impingement of feed material discharged from said feed tube on an inner surface of said reactor tube while said reactor is operating; and (e) thereafter refixing the orientation of said feed tube relative to said reactor.

13. A method as defined in claim 12, further comprising:

selectively fixing the axial position of said feed tube relative to said pivot mounting assembly;

thereafter adjusting the axial position of said feed tube relative to said pivot mounting assembly while said reactor is operating; and thereafter refixing the axial position of said feed tube relative to said pivot mounting assembly.

14. A method as defined in claim 13, further comprising:

detecting the quality of reactants from said reactor; and adjusting the axial position of said feed tube relative to said pivot mounting assembly in response to said detected quality of reactants.

15. A method as defined in claim 12, wherein steps (c) and (d) are repeated until impringment of said feed material on said inner surface of said reactor tube is at least substantially reduced.

16. A method as defined in claim 15, wherein said feed tube is refixed at a selected orientation not in alignment with said reactor tube for at least substantially reducing said undesirable condition.

17. A method as defined in claim 12, further comprising:

sealing positioning said feed tube within said pivot mounting assembly.

18. A method as defined in claim 12, further comprising:

step (c) includes visually observing the uniformity of said fluid wall within said reactor tube.

19. A method as defined in claim 12, further comprising:

step (c) includes visually observing the build-up of reactant products adjacent a feed material exit of said reactor; and step (d) includes pivotably adjusting said feed tube in response to said observed build-up for minimizing or correcting said build-up on a portion of said inner surface of said reactor tube adjacent said feed material exit.

20. A method as defined in claim 12, further comprising:

step (c) includes detecting characteristics of the output from the reactor; and step (d) includes pivotably adjusting the orientation of said feed tube in response to said detected characteristics.

* * * * *